US011492458B2

(12) United States Patent
Thuilliez et al.

(10) Patent No.: US 11,492,458 B2
(45) Date of Patent: Nov. 8, 2022

(54) SULFUR-FREE CROSSLINKED COMPOSITION COMPRISING A PHENOLIC COMPOUND

(71) Applicant: COMPAGNIE GENERALE DES ETABLISSEMENTS MICHELIN, Clermont-Ferrand (FR)

(72) Inventors: Anne-Lise Thuilliez, Clermont-Ferrand (FR); Odile Gavard-Lonchay, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 18 days.

(21) Appl. No.: 16/954,810

(22) PCT Filed: Dec. 11, 2018

(86) PCT No.: PCT/FR2018/053176
§ 371 (c)(1),
(2) Date: Jun. 17, 2020

(87) PCT Pub. No.: WO2019/122586
PCT Pub. Date: Jun. 27, 2019

(65) Prior Publication Data
US 2021/0087356 A1    Mar. 25, 2021

(30) Foreign Application Priority Data

Dec. 21, 2017  (FR) ..................................... 1762733

(51) Int. Cl.
| | | |
|---|---|---|
| C08K 5/13 | (2006.01) | |
| B60C 1/00 | (2006.01) | |
| B60C 9/00 | (2006.01) | |
| C08K 3/04 | (2006.01) | |
| C08K 5/14 | (2006.01) | |
| C08L 7/00 | (2006.01) | |

(52) U.S. Cl.
CPC .............. *C08K 5/13* (2013.01); *B60C 1/0041* (2013.01); *B60C 9/0007* (2013.01); *C08K 3/04* (2013.01); *C08K 5/14* (2013.01); *C08L 7/00* (2013.01); *B60C 2009/0021* (2013.01)

(58) Field of Classification Search
CPC . C08K 5/13; B60C 1/0041; B60C 2009/0021; C08L 7/00
See application file for complete search history.

(56) References Cited

U.S. PATENT DOCUMENTS

| | | | |
|---|---|---|---|
| 5,977,238 A | 11/1999 | Labauze | |
| 6,013,718 A | 1/2000 | Cabioch et al. | |
| 6,138,731 A | 10/2000 | Miyazaki et al. | |
| 6,503,973 B2 | 1/2003 | Robert et al. | |
| 6,552,128 B2 | 4/2003 | Ikemoto et al. | |
| 6,774,255 B1 | 8/2004 | Tardivat et al. | |
| 6,815,473 B2 | 11/2004 | Robert et al. | |
| 7,199,175 B2 | 4/2007 | Vasseur | |
| 7,250,463 B2 | 7/2007 | Durel et al. | |
| 7,300,970 B2 | 11/2007 | Durel et al. | |
| 7,312,264 B2 | 12/2007 | Gandon-Pain | |
| 7,488,768 B2 | 2/2009 | Tardivat et al. | |
| 7,491,767 B2 | 2/2009 | Durel et al. | |
| 7,820,771 B2 | 10/2010 | Lapra et al. | |
| 7,900,667 B2 | 3/2011 | Vasseur | |
| 8,461,269 B2 | 6/2013 | Varagniat et al. | |
| 8,492,475 B2 | 7/2013 | Araujo Da Silva et al. | |
| 8,883,929 B2 | 11/2014 | Gandon-Pain et al. | |
| 9,010,393 B2 | 4/2015 | Araujo Da Silva et al. | |
| 9,539,859 B2 | 1/2017 | Shibata | |
| 10,544,292 B2 | 1/2020 | Doisneau et al. | |
| 10,544,298 B2 | 1/2020 | Doisneau et al. | |
| 10,590,225 B2 | 3/2020 | Thuilliez et al. | |
| 10,604,613 B2 | 3/2020 | Doisneau et al. | |
| 10,647,848 B2 | 5/2020 | Thuilliez et al. | |
| 10,711,131 B2 | 7/2020 | Thuilliez et al. | |
| 10,711,132 B2 | 7/2020 | Thuilliez et al. | |
| 2001/0036991 A1 | 11/2001 | Robert et al. | |
| 2002/0068797 A1 | 6/2002 | Ikemoto et al. | |
| 2002/0142166 A1 | 10/2002 | Suzuki et al. | |
| 2002/0183436 A1 | 12/2002 | Robert et al. | |
| 2003/0212185 A1 | 11/2003 | Vasseur | |
| 2004/0051210 A1 | 3/2004 | Tardivat et al. | |
| 2004/0132880 A1 | 7/2004 | Durel et al. | |
| 2005/0004297 A1 | 1/2005 | Durel et al. | |
| 2005/0016650 A1 | 1/2005 | Durel et al. | |
| 2005/0016651 A1 | 1/2005 | Durel et al. | |
| 2006/0089445 A1 | 4/2006 | Gandon-Pain | |
| 2007/0112120 A1 | 5/2007 | Vasseur | |
| 2008/0132644 A1 | 6/2008 | Lapra et al. | |
| 2009/0186961 A1 | 7/2009 | Araujo Da Silva et al. | |
| 2009/0209709 A1 | 8/2009 | Araujo Da Silva et al. | |
| 2009/0234066 A1 | 9/2009 | Araujo Da Silva et al. | |
| 2009/0270558 A1 | 10/2009 | Gandon-Pain et al. | |
| 2010/0022714 A1 | 1/2010 | Varagniat et al. | |
| 2011/0021702 A1 | 1/2011 | Gandon-Pain et al. | |
| 2011/0152458 A1 | 6/2011 | Araujo Da Silva et al. | |
| 2012/0103487 A1* | 5/2012 | Majumdar ................ C08L 9/02 152/209.5 |
| 2012/0208948 A1 | 8/2012 | Gandon-Pain et al. | |
| 2013/0078477 A1 | 3/2013 | Shibata | |
| 2013/0196085 A1 | 8/2013 | Voge et al. | |

(Continued)

FOREIGN PATENT DOCUMENTS

| | | |
|---|---|---|
| DE | 19802864 A1 | 9/1998 |
| EP | 1127909 A1 | 8/2001 |

(Continued)

OTHER PUBLICATIONS

A. Y. Coran, "Vulcanization," Chapter 7, in Science and Technology of Rubber (Second Edition) 339 (1994), 47 pages.*

(Continued)

*Primary Examiner* — Nicholas E Hill
(74) *Attorney, Agent, or Firm* — Venable LLP

(57) ABSTRACT

A rubber composition is based on at least one elastomer and at least one phenolic compound, the aromatic nucleus of said phenolic compound being substituted with at least one substituent comprising an oxygen atom, the molar mass of said phenolic compound being at most equal to 1000 g/mol, and said composition being free of molecular sulfur or comprising less than 1 phr thereof.

13 Claims, No Drawings

(56) References Cited

U.S. PATENT DOCUMENTS

| | | |
|---|---|---|
| 2015/0322234 A1 | 11/2015 | Fleury et al. |
| 2018/0326786 A1 | 11/2018 | Thuilliez et al. |
| 2018/0371141 A1 | 12/2018 | Thuilliez et al. |
| 2020/0031980 A1 | 1/2020 | Doisneau et al. |
| 2021/0087366 A1 | 3/2021 | Thuilliez et al. |
| 2021/0347966 A1 | 11/2021 | Gavard-Lonchay et al. |
| 2021/0380784 A1 | 12/2021 | Thuilliez et al. |

FOREIGN PATENT DOCUMENTS

| | | |
|---|---|---|
| EP | 1226932 A1 | 7/2002 |
| EP | 2581237 A1 | 4/2013 |
| FR | 2740778 A1 | 5/1997 |
| FR | 2765882 A1 | 1/1999 |
| JP | 2011-252107 A | 12/2011 |
| WO | 97/36724 A2 | 10/1997 |
| WO | 99/16600 A1 | 4/1999 |
| WO | 01/92402 A1 | 12/2001 |
| WO | 02/10269 A2 | 2/2002 |
| WO | 02/30939 A1 | 4/2002 |
| WO | 02/31041 A1 | 4/2002 |
| WO | 03/002648 A1 | 1/2003 |
| WO | 03/002649 A1 | 1/2003 |
| WO | 03/016387 A1 | 2/2003 |
| WO | 2004/096865 A1 | 11/2004 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2011/092124 A1 | 8/2011 |
| WO | 2014/095582 A1 | 6/2014 |
| WO | 2017/064091 A1 | 4/2017 |
| WO | 2017/081387 A1 | 5/2017 |
| WO | 2017/081388 A1 | 5/2017 |
| WO | 2017/103387 A1 | 6/2017 |

OTHER PUBLICATIONS

Sirilux Poompradub et al., "Improving Oxidation Stability and Mechanical Properties of Natural Rubber Vulcanizates Filled with Calcium Carbonate Modified by Gallic Acid," 66 Polymer Bulletin 965 (2011), 13 pages.*
Eliane Trovatti et al., "Recycling Tires? Reversible Crosslinking of Poly(butadiene)," 27 Advanced Materials 2242 (2015), 4 pages.*
Roop S. Bhakuni et al., "Tire Cord," Kirk-Othmer Encyclopedia of Chemical Technology, first published 2000, 23 pages. (Year: 2000).*
International Search Report dated Mar. 21, 2019, in corresponding PCT/FR2018/053176 (4 pages).

* cited by examiner

SULFUR-FREE CROSSLINKED COMPOSITION COMPRISING A PHENOLIC COMPOUND

TECHNICAL FIELD OF THE INVENTION

The present invention relates to elastomer-based rubber compositions, to composites comprising such compositions, and also to tyres comprising such compositions or such composites.

PRIOR ART

Tyre reinforcement plies usually comprise a rubber mixture and reinforcing cables, which are often metallic and covered at the surface with brass. Since these plies are subjected to high stresses during the rolling of the tyres, it is understood that the adhesion between the rubber and the reinforcing elements is a key property.

The adhesion function generally imposes specific formulations on the rubber mixture, notably the need for a high content of sulfur and of zinc oxide, a low amount of stearic acid, the presence of a cobalt salt, and the use of a delayed-action accelerator. However, these vulcanization systems with a high sulfur content constitute a large constraint during the manufacturing of semi-finished articles, in particular for avoiding premature crosslinking.

It would thus be advantageous for tyre manufacturers to find rubber composition formulations which make it possible to dispense with the sulfur in the composites while at the same time allowing good adhesion to the reinforcing cables.

WO 2017/081387 and WO 2017/081388 present a rubber composition and a composite based on a polymer matrix including a functional diene polymer. This functional diene polymer bears at least one aromatic group substituted with at least two vicinal hydroxyl functions. The crosslinking of the rubber composition is performed with a vulcanization system or a system based on one or more peroxide compounds. Good adhesion properties of the rubber composition to the metal are obtained, but require the use of a grafted polymer. It would thus be advantageous to have available a simpler solution for improving the adhesion properties.

Patent application JP 2011252107 describes a rubber composition with good adhesion to metal, this composition comprising a diene elastomer and cobalt salt. Gallic acid or a gallic acid hydrate facilitates the dissolution of the cobalt salt. The composition is crosslinked with a sulfur-based system. Although having good adhesion characteristics, this composition uses both sulfur and a cobalt salt.

Furthermore, the improvement in the adhesion must not be achieved at the expense of the stiffness of the composition.

SUMMARY OF THE INVENTION

Continuing its research, the Applicant has discovered a rubber composition which can solve the problems mentioned, which has particularly advantageous characteristics in terms of adhesion to a reinforcing element, in particular for making composites intended for tyres, while at the same time improving the stiffness properties of said composition. The composition according to the invention thus makes it possible to obtain excellent adhesion to reinforcing elements and good stiffness, not requiring any vulcanization or sulfurization, or the presence of cobalt salts.

DETAILED DESCRIPTION OF THE INVENTION

The invention relates to a rubber composition based on at least one elastomer, a reinforcing filler and at least one phenolic compound of general formula (I)

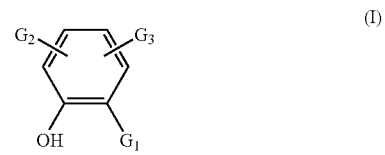

in which:
 $G_1$ represents a hydroxyl, carboxyl or alkoxy group or a hydrogen atom;
 $G_2$ represents a hydroxyl group or a hydrogen atom;
 $G_3$ represents a hydroxyl, carboxyl, hydrogenocarbonyl, carboxyalkyl, amino or aminoalkyl group or a hydrogen atom;
at least one of the substituents $G_1$ to $G_3$ comprising an oxygen atom, the molar mass of said phenolic compound being at most equal to 1000 g/mol, said composition being free of molecular sulfur or comprising less than 1 phr thereof.

Definitions

The expression "composition based on" should be understood as meaning a composition including the mixture and/or the product of the in situ reaction of the various constituents used, some of these (base) constituents being able to react and/or being intended to react with each other, at least partially, during the various phases of manufacture of the composition, modifying the composition as it is prepared at the start. Thus, the compositions as employed for the invention may be different in the non-crosslinked state and in the crosslinked state.

The expression "part by weight per hundred parts by weight of elastomer" (or phr) should be understood, within the meaning of the present invention, as meaning the part by mass per hundred parts by mass of elastomer.

In the present document, unless expressly indicated otherwise, all the percentages (%) shown are mass percentages (%).

Furthermore, any interval of values denoted by the expression "between a and b" represents the range of values extending from more than "a" to less than "b" (i.e. limits a and b excluded), while any interval of values denoted by the expression "from a to b" means the range of values extending from "a" up to "b" (i.e. including the strict limits a and b). In the present document, when an interval of values is denoted by the expression "from a to b", the interval represented by the expression "between a and b" is also and preferentially denoted.

The compounds comprising carbon mentioned in the description may be of fossil origin or biobased. In the latter case, they may be partially or totally derived from biomass or may be obtained from renewable starting materials derived from biomass. Polymers, plasticizers, fillers and the like are notably concerned.

Elastomer

The composition according to the invention comprises at least one elastomer, advantageously chosen from diene, olefinic and thermoplastic elastomers and mixtures thereof and preferably from highly unsaturated diene, olefinic and thermoplastic elastomers and mixtures thereof.

Diene Elastomer

It is recalled that the term "diene elastomer" or "rubber" (the two terms being, in a known manner, synonymous and interchangeable) should be understood as meaning an elastomer which results at least partly (i.e., a homopolymer or a copolymer) from diene monomers (monomers bearing two conjugated or non-conjugated carbon-carbon double bonds). In the present patent application, the diene elastomers are by definition non-thermoplastic.

Since diene elastomers have, in the vast majority of cases, a negative Tg, i.e. a value less than 0° C., they may be categorized in a known manner into two categories: those referred to as "essentially unsaturated" and those referred to as "essentially saturated".

An "essentially unsaturated" diene elastomer is understood to refer to a diene elastomer resulting at least partly from conjugated diene monomers having a content of units of diene origin (conjugated dienes) which is greater than 15% (mol %). In the category of "essentially unsaturated" diene elastomers, a "highly unsaturated" diene elastomer is understood in particular to refer to a diene elastomer having a content of units of diene origin (conjugated dienes) which is greater than 50%.

In contrast, the term "essentially saturated" diene elastomer refers to elastomers with a low or very low content of units of diene origin, always less than 15% (mol %), such as butyl rubbers, for instance copolymers of dienes and of α-olefins of EPDM type.

Given these definitions, the term "diene elastomer", whatever the above category, that may be used in the compositions in accordance with the invention more particularly refers to:

(a) any homopolymer obtained by polymerization of a conjugated diene monomer containing from 4 to 12 carbon atoms;
(b) any copolymer obtained by copolymerization of one or more conjugated dienes with each other or with one or more vinylaromatic compounds containing from 8 to 20 carbon atoms;
(c) a ternary copolymer obtained by copolymerization of ethylene and of an α-olefin containing from 3 to 6 carbon atoms with a non-conjugated diene monomer containing from 6 to 12 carbon atoms, for instance the elastomers obtained from ethylene and propylene with a non-conjugated diene monomer of the abovementioned type notably such as 1,4-hexadiene, ethylidenenorbornene or dicyclopentadiene;
(d) a copolymer of isobutene and of isoprene (diene butyl rubber) and also the halogenated versions, in particular chlorinated or brominated versions, of this type of copolymer. 1,3-Butadiene, 2-methyl-1,3-butadiene, 2,3-di($C_1$-$C_5$ alkyl)-1,3-butadienes, for instance 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene and 2,4-hexadiene are notably suitable as conjugated dienes. Examples of vinylaromatic compounds that are suitable for use include styrene, ortho-, meta- or para-methylstyrene, the "vinyltoluene" commercial mixture, para-(tert-butyl)styrene, methoxystyrenes, chlorostyrenes, vinylmesitylene, divinylbenzene and vinylnaphthalene.

The copolymers may contain between 99% and 20% by weight of diene units and between 1% and 80% by weight of vinylaromatic units.

It is preferable to use at least one diene elastomer of the highly unsaturated type, in particular a diene elastomer chosen from the group consisting of natural rubber (NR), synthetic polyisoprenes (IRs), polybutadienes (BRs), butadiene copolymers, isoprene copolymers and mixtures of these elastomers. Such copolymers are more preferentially chosen from the group consisting of butadiene/styrene copolymers (SBRs), isoprene/butadiene copolymers (BIRs), isoprene/styrene copolymers (SIRs), isoprene/butadiene/styrene copolymers (SBIRs) and mixtures of such copolymers.

The following are preferably suitable: polybutadienes and in particular those with a content of 1,2-units of between 4% and 80% or those with a content of cis-1,4- units of greater than 80%, polyisoprenes, butadiene/styrene copolymers and in particular those with a styrene content of between 5% and 50% by weight and more particularly between 20% and 40%, a content of 1,2- bonds of the butadiene part of between 4% and 65% and a content of trans-1,4- bonds of between 20% and 80%, butadiene/isoprene copolymers and in particular those with an isoprene content of between 5% and 90% by weight and a glass transition temperature of from −40° C. to −80° C., or isoprene/styrene copolymers and in particular those with a styrene content of between 5% and 50% by weight and a $T_g$ of between −25° C. and −50° C.

In the case of butadiene/styrene/isoprene copolymers, those with a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2- units of the butadiene part of between 4% and 85%, a content of trans-1,4- units of the butadiene part of between 6% and 80%, a content of 1,2- plus 3,4- units of the isoprene part of between 5% and 70% and a content of trans-1,4- units of the isoprene part of between 10% and 50%, and more generally any butadiene/styrene/isoprene copolymer with a Tg of between −20° C. and 70° C., are notably suitable for use.

The elastomers may have any microstructure, which depends on the polymerization conditions used, notably on the presence or absence of a modifying and/or randomizing agent and on the amounts of modifying and/or randomizing agent used. The elastomers may, for example, be prepared in dispersion or in solution; they may be coupled and/or star-branched or else functionalized with a coupling and/or star-branching or functionalization agent.

For coupling to carbon black, examples that may be mentioned include functional groups comprising a C—Sn bond or aminated functional groups, such as benzophenone, for example; for coupling to a reinforcing inorganic filler, such as silica, examples that may be mentioned include silanol functional groups or polysiloxane functional groups having a silanol end (as described, for example, in FR 2 740 778 or U.S. Pat. No. 6,013,718), alkoxysilane groups (as described, for example, in FR 2 765 882 or U.S. Pat. No. 5,977,238), carboxyl groups (as described, for example, in WO 01/92402 or U.S. Pat. No. 6,815,473, WO 2004/096865 or US 2006/0089445) or else polyether groups (as described, for example, in EP 1 127 909 or U.S. Pat. No. 6,503,973). As other examples of functionalized elastomers, mention may also be made of elastomers (such as SBR, BR, NR or IR) of the epoxidized type.

The $T_g$ of the polymers described above is measured, in a known manner, by DSC (Differential Scanning Calorimetry), for example and unless specifically indicated otherwise in the present application, according to the standard ASTM D3418 (1999).

Olefinic Elastomer

For the purposes of the present invention, the term "elastomer of the olefinic type" means an elastomer whose elastomeric chain is a carbon-based chain predominantly including olefin monomer units denoted as O.

The monomers O may originate from any olefin known to those skilled in the art, for instance ethylene, propylene, butylene or isobutylene, these monomers optionally being substituted with linear or branched alkyl groups.

Preferentially, O is an ethylene unit[—CH2-CH2-] and, in this preferential case, the olefinic elastomer is an ethylenic elastomer.

The molar content of O is greater than 50%. More precisely, the molar content of O is between 50% and 100%, advantageously between 50% and 95% and preferentially between 65% and 85%. For the purposes of the present invention, the elastomer of olefinic type is thus a copolymer also including from 0 to 50 mol % of non-olefinic units, i.e. units other than O.

The non-olefinic units, denoted as A', are present in the carbon-based chain so that the total molar content represented by the monomers O and A' is equal to 100%. The non-olefinic monomers that are useful for preparing the olefinic elastomers may be chosen from non-olefinic monomers not resulting in unsaturations and monomers which, once polymerized, result in unsaturations borne by the elastomer chain (other than diene monomers).

The non-olefinic monomers not resulting in unsaturations are essentially vinyl and acrylic/methacrylic monomers. For example, such monomers may be chosen from styrene, vinyl acetate, vinyl alcohol, acrylonitrile, methyl acrylate or methyl methacrylate, these monomers optionally being substituted with alkyl or aryl groups or other functionalized groups.

For example also, the non-diene monomers that are useful for preparing the elastomers of olefinic type bearing unsaturations by copolymerization are all those known to a person skilled in the art for forming unsaturated elastomers, for instance dicyclopentadienyloxyethyl methacrylate.

Thermoplastic Elastomer (TPE)

For the purposes of the present invention, the term "thermoplastic elastomers" means thermoplastic elastomers (abbreviated as TPE) which have a structure intermediate between thermoplastic polymers and elastomers. They are block copolymers consisting of rigid thermoplastic blocks connected by flexible elastomer blocks.

The thermoplastic elastomer advantageously included in the composition according to the invention is a block copolymer, the chemical nature of the thermoplastic and elastomer blocks of which can vary.

In the present patent application, when reference is made to the glass transition temperature of the TPE, it concerns the Tg relative to the elastomer block. The TPE preferentially has a glass transition temperature (Tg) which is preferentially less than or equal to 25° C., more preferentially less than or equal to 10° C. A Tg value greater than these minima may reduce the performance qualities of the composition according to the invention when used at very low temperature; for such a use, the Tg of the TPE is even more preferably less than or equal to −10° C. Preferably also, the Tg of the TPE is greater than −100° C.

In a known manner, TPEs have two glass transition temperature peaks (Tg, measured according to ASTM D3418), the lower temperature being relative to the elastomer part of the TPE and the higher temperature being relative to the thermoplastic part of the TPE. Thus, the flexible blocks of the TPEs are defined by a Tg which is less than ambient temperature (25° C.), while the rigid blocks have a Tg of greater than 60° C.

In order to be both elastomeric and thermoplastic in nature, the TPE has to be equipped with blocks that are sufficiently incompatible (i.e. different as a result of their respective masses, their respective polarities or their respective Tg values) to retain their own properties of elastomer block or thermoplastic block.

The TPEs may be copolymers with a small number of blocks (less than 5, typically 2 or 3), in which case these blocks preferably have high masses of greater than 15 000 g/mol. These TPEs may, for example, be diblock copolymers, comprising a thermoplastic block and an elastomer block. These are often also triblock elastomers with two rigid segments connected by a flexible segment. The rigid and flexible segments may be positioned linearly, in a star or branched configuration. Typically, each of these segments or blocks often contains a minimum of more than 5, generally of more than 10, base units (for example, styrene units and butadiene units for a styrene/butadiene/styrene block copolymer).

The TPEs may also comprise a large number of smaller blocks (more than 30, typically from 50 to 500), in which case these blocks preferably have relatively low masses, for example from 500 to 5000 g/mol; these TPEs will be referred to hereinbelow as multiblock TPEs and are an elastomer block/thermoplastic block sequence.

The TPE may be in a linear form, star form with at least three branches, branched or dendrimer form.

For example, the TPE is a copolymer chosen from the following group: styrene/isobutylene/styrene (SIBS), styrene/butadiene/styrene (SBS), styrene/isoprene/styrene (SIS), polybutadiene/polyurethane (TPU), polyether/polyester (COPE), polyether/polyamide (PEBA).

It is also possible for the TPEs given as examples above to be mixed with each other within the layers of the multilayer laminate according to the invention.

As examples of commercially available TPE elastomers, mention may be made of the elastomers of SIS type sold by Kuraray under the name Hybrar 5125 or sold by Kraton under the name D1161, or else the elastomers of linear SBS type sold by Polimeri Europa under the name Europrene SOLT 166 or of star-branched SBS type sold by Kraton under the name D1184. Mention may also be made of the elastomers sold by the company Dexco Polymers under the name Vector (e.g. Vector 4114 or Vector 8508). Among the multiblock TPEs, mention may be made of the Vistamaxx TPE sold by the company Exxon; the COPE TPE sold by the company DSM under the name Arnitel or by the company DuPont under the name Hytrel or by the company Ticona under the name Riteflex; the PEBA TPE sold by the company Arkema under the name PEBAX; or the TPU TPE sold by the company Sartomer under the name TPU 7840 or by the company BASF under the name Elastogran.

Functionalization

In one particular arrangement, the composition according to the invention comprises at least one functionalized elastomer. The term "functionalized" means that it bears a functional group, advantageously a functional group comprising a function such as a conjugated diene function, and an epoxide function, a carbonyl function, an anhydride function or an acid ester function, advantageously a functional group chosen from the group consisting of furan, anthracene, cyclopentadiene, pyrrole, thiophene and epoxide groups, advantageously chosen from the group consisting of furan, anthracene, cyclopentadiene, fulvene and epoxide groups, very advantageously chosen from the group consisting of anthracene and epoxide groups.

The term "conjugated diene" function, which is well known to those skilled in the art, means the presence of two successive carbon-carbon double bonds, which may be located either on the elastomer chain or on a branch of the elastomer chain, in which case it will be referred to as a pendant function.

The functions present on the elastomer are obtained, in a manner known to those skilled in the art, by copolymerization or by post-polymerization modification, and are either borne directly by the backbone of the chain, or borne by a side group depending on the production method.

For example, the epoxidized diene elastomers may be obtained by epoxidation of the equivalent non-epoxidized diene elastomer, for example by processes based on chlorohydrin or on bromohydrin or processes based on hydrogen peroxides, on alkyl hydroperoxides or on peracids (such as peracetic acid or performic acid); see notably Kautsch. Gummi Kunstst., 2004, 57(3), 82, or else by radical copolymerization of the diene monomers with monomers bearing epoxide functions, notably methacrylic acid esters including epoxide functions, for instance glycidyl methacrylate (see, for example, Macromolecules 1998, 31, 2822) or via the use of nitrile oxides bearing epoxide functions.

Crosslinking System

The crosslinking generally improves the elastic properties of the rubber composition.

The crosslinking system is intended to react to bring about crosslinking of the rubber composition.

In a manner known to those skilled in the art, the crosslinking of elastomers may be performed in several ways as a function of the nature of said elastomers.

Any type of crosslinking that is suitable, according to the knowledge of a person skilled in the art, for the elastomers used in the composition according to the invention may be used in the context of the invention, provided that it is free of molecular sulfur, i.e. provided that sulfur is not the essential ingredient of said crosslinking system.

Thus, the rubber composition in accordance with the invention is free of molecular sulfur or contains less than 1 phr, preferably less than 0.5 phr and more preferentially less than 0.2 phr thereof. Very preferably, the composition does not comprise any molecular sulfur as crosslinking agent.

In the particular arrangement in which the elastomer is predominantly composed of thermoplastic elastomer compound, it is possible to not use any crosslinking system and the solidification of the thermoplastic blocks may suffice to rigidify the elastomer efficiently via a form of physical crosslinking of the thermoplastic blocks. In another particular arrangement in which the elastomer is predominantly composed of thermoplastic elastomer compound, the crosslinking system may advantageously be based on one or several peroxide compounds, as described, for example, in WO 2017/103387, or else the crosslinking may be performed by radiation as described, for example, in WO 2017/064091.

In the particular arrangement in which the elastomer of which the rubber composition according to the invention is composed predominantly comprises diene elastomers, the crosslinking system may advantageously be based on one or more peroxide compounds or based on one or more compounds of thiuram polysulfide type.

When the elastomer of the composition according to the invention is functionalized, particular crosslinking agents may be used, depending on the nature of the function borne by the elastomer. Thus, it is notably possible to crosslink the epoxidized elastomers described previously with polyacids, or to crosslink the elastomers containing conjugated double bonds described previously with polydienophiles.

Peroxides

In the particular case in which the composition according to the invention comprises a diene elastomer or a thermoplastic elastomer, the crosslinking system is advantageously based on one or more peroxide compounds, said peroxide compound(s) representing from 0.01 to 10 phr.

The peroxide that may be used in the composition according to the invention may be any peroxide known to a person skilled in the art.

Preferably, the peroxide is chosen from organic peroxides.

The term "organic peroxide" means an organic compound, i.e. a compound containing carbon, including an —O—O— group (two oxygen atoms linked via a covalent single bond).

During the crosslinking process, the organic peroxide decomposes at its unstable 0-0 bond into free radicals. These free radicals allow the creation of the crosslinking bonds.

According to one embodiment, the organic peroxide is chosen from the group consisting of dialkyl peroxides, monoperoxycarbonates, diacyl peroxides, peroxyketals and peroxyesters.

Preferably, the dialkyl peroxides are chosen from the group consisting of dicumyl peroxide, di(t-butyl) peroxide, t-butyl cumyl peroxide, 2,5-dimethyl-2,5-di(t-butylperoxy) hexane, 2,5-dimethyl-2,5-di(t-amylperoxy)hexane, 2,5-dimethyl-2,5-di(t-butylperoxy)hex-3-yne, 2,5-dimethyl-2,5-di (t-amylperoxy)hex-3-yne, α,α'-di[(t-butylperoxy)isopropyl] benzene, α,α'-di[(t-amylperoxy)isopropyl]benzene, di(t-amyl) peroxide, 1,3,5-tri[(t-butylperoxy)isopropyl]benzene, 1,3-dimethyl-3-(t-butylperoxy)butanol and 1,3-dimethyl-3-(t-amylperoxy)butanol.

A mixture of dicumyl peroxide and of 1,3- and 1,4-isopropylcumyl cumyl peroxide (sold, for example, by Arkema under the trade name Luperox® DC60) is also advantageous.

Certain monoperoxycarbonates, such as OO-tert-butyl O-(2-ethylhexyl) monoperoxycarbonate, OO-tert-butyl O-isopropyl monoperoxycarbonate and OO-tert-amyl O-(2-ethylhexyl) monoperoxycarbonate, may also be used.

Among the diacyl peroxides, the preferred peroxide is benzoyl peroxide.

Among the peroxyketals, the preferred peroxides are chosen from the group consisting of 1,1-di(t-butylperoxy)-3,3,5-trimethylcyclohexane, n-butyl 4,4-di(t-butylperoxy) valerate, ethyl 3,3-di(t-butylperoxy)butyrate, 2,2-di(t-amylperoxy)propane, 3,6,9-triethyl-3,6,9-trimethyl-1,4,7-triperoxynonane (or methyl ethyl ketone peroxide cyclic trimer), 3,3,5,7,7-pentamethyl-1,2,4-trioxepane, n-butyl 4,4-bis(t-amylperoxy)valerate, ethyl 3,3-di(t-amylperoxy) butyrate, 1,1-di(t-butylperoxy)cyclohexane, 1,1-di(t-amylperoxy)cyclohexane and mixtures thereof.

Preferably, the peroxyesters are chosen from the group consisting of tert-butyl peroxybenzoate, tert-butyl peroxy-2-ethylhexanoate and tert-butyl peroxy-3,5,5-trimethylhexanoate.

Particularly preferably, the organic peroxide is chosen from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane, n-butyl 4,4'-di(tert-butylperoxy)valerate, OO-(t-butyl) O-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and mixtures thereof, more preferentially from the group consisting of dicumyl peroxide, n-butyl 4,4'-di(tert-butylperoxy)valerate, OO-(t-butyl) O-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and mixtures thereof.

Thiuram Polysulfide

In the particular case in which the composition according to the invention comprises a diene elastomer, the crosslinking system is advantageously based on one or more compounds of thiuram polysulfide type, said thiuram polysulfide compound(s) representing from 0.5 to 15 phr.

After curing, such a crosslinking agent turns out to provide sufficient cohesion to the composition, without giving it true crosslinking the measurable crosslinking, via a conventional swelling method known to those skilled in the art, in fact hovers at the detection threshold. Preferably, the thiuram polysulfide content is between 0.5 and 10 phr, more preferentially within a range from 1 to 5 phr. Such compounds are known to those skilled in the art and are described, for example, in WO 2011/092124. As thiuram polysulfide compounds that may be used as chemical crosslinking system, mention may be made of tetrabenzylthiuram disulfide ("TBzTD"), tetramethylthiuram disulfide ("TMTD"), dipentamethylenethiuram tetrasulfide ("DPTT"), and mixtures of such compounds.

Polyacids

In the particular case in which the composition according to the invention comprises an epoxide functionalized elastomer, the crosslinking system is advantageously based on one or more polyacid compounds, said diacid compound(s) representing from 0.2 to 100 phr, preferably from 0.2 to 50 phr, more preferentially from 0.9 to 20 phr.

The term "polyacid compound such as a diacid" means a compound comprising several carboxylic acid functions, for example two carboxylic acid functions borne on either side of a group A, A being a hydrocarbon-based divalent group comprising from 1 to 1800 carbon atoms. Such compounds are described, for example, in patent application WO 2014/095582. Said crosslinking system based on one or more polyacid compounds also comprises an imidazole representing from 0.01 to 4 molar equivalents, preferably from 0.01 to 3 molar equivalents relative to the carboxylic acid functions present on the polyacid compound(s). As imidazole compounds that may be used as chemical crosslinking system, mention may be made of 1,2-dimethylimidazole, 1-decyl-2-methylimidazole or 1-benzyl-2-methylimidazole, the latter being preferential.

The term "molar equivalent", which is well known to those skilled in the art, should be understood as meaning the quotient between the number of moles of the compound or function concerned and the number of moles of the reference compound or function. Thus, 2 equivalents of a compound or function B relative to a compound or function A represent 2 mol of the compound or function B when 1 mol of the compound or function A is used.

Polydienophile

In the particular case in which the composition according to the invention comprises a functionalized elastomer comprising a conjugated diene function, the crosslinking system is advantageously based on one or more polydienophiles.

The compounds that are in particular suitable for use are those of general formula (I)

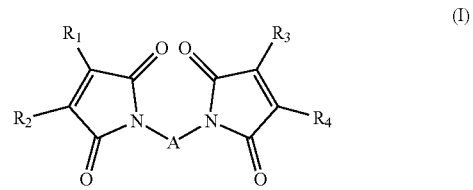

in which:

A represents a covalent bond or a hydrocarbon-based group including at least 1 carbon atom, which is optionally substituted and optionally interrupted with one or more heteroatoms, $R_1$, $R_2$, $R_3$ and $R_4$ represent, independently of each other, identical or different groups chosen from a hydrogen atom and hydrocarbon-based groups, $R_1$ and $R_2$ on the one hand and $R_3$ and $R_4$ on the other hand possibly forming, together with the carbon atoms of the ring to which they are attached, a ring.

Preferably, in the polydienophile of general formula (I), A represents a covalent bond or a divalent hydrocarbon-based group including from 1 to 1800 carbon atoms, preferentially from 2 to 300 carbon atoms, more preferentially from 2 to 100 carbon atoms and very preferentially from 2 to 50 carbon atoms. Above 1800 carbon atoms, the polydienophile is a less effective crosslinking agent. Thus, A preferably represents a divalent hydrocarbon-based group including from 3 to 50 carbon atoms, preferentially from 5 to 50 carbon atoms, more preferentially from 8 to 50 carbon atoms and even more preferentially from 10 to 40 carbon atoms.

Preferentially, A is a divalent group of aliphatic or aromatic type or a group including at least an aliphatic portion and an aromatic portion, and preferably a divalent group of aromatic type or a group including at least an aliphatic portion and an aromatic portion. More preferentially, A is a divalent group including at least an aliphatic portion and an aromatic portion of arylene-dialkylene or alkylene-diarylene type; and, notably, A is preferentially a phenylene-dialkylene group (such as phenylene-dimethylene or phenylene-diethylene) or an alkylene-diphenylene group (such as methylene-diphenylene).

Preferably, when A is interrupted, it is interrupted with at least one heteroatom chosen from oxygen, nitrogen and sulfur, preferably oxygen.

According to a preferential embodiment, A is substituted with at least one radical chosen from alkyl, cycloalkylalkyl, aryl, aralkyl, hydroxyl, alkoxy, amino and carbonyl radicals.

The radicals $R_1$, $R_2$, $R_3$ and $R_4$ represent, independently of each other, identical or different groups chosen from a hydrogen atom, alkyls containing from 1 to 20 carbon atoms, cycloalkyls containing from 5 to 24 carbon atoms, aryls containing from 6 to 30 carbon atoms and aralkyls containing from 7 to 25 carbon atoms; groups which may optionally be interrupted with one or more heteroatoms and/or substituted, $R_1$ and $R_2$ on the one hand and $R_3$ and $R_4$ on the other hand possibly forming, together with the carbon atoms of the ring to which they are attached, a ring chosen from aromatic, heteroaromatic or aliphatic rings comprising from 5 to 12 carbon atoms, preferably 5 or 6 carbon atoms. Preferably, $R_1$, $R_2$, $R_3$ and $R_4$ represent, independently of each other, identical or different groups chosen from a hydrogen atom and linear or branched alkyls containing from 1 to 6 carbon atoms; groups which may optionally be substituted.

Preferably, in the composition according to the invention, the content of polydienophile is within a range extending from 0.2 to 100 phr and preferably from 0.2 to 50 phr. This is because, below 0.2 phr of polydienophile, the effect of the crosslinking is not substantial, whereas, above 100 phr of polydienophile, the polydienophile, the crosslinking agent, becomes predominant by weight relative to the polymer matrix. Thus, preferentially, the content of polydienophile is within a range extending from 0.4 to 27 phr and preferably from 0.9 to 20 phr.

The polydienophiles that are useful for the purposes of the invention are either commercially available or readily prepared by those skilled in the art according to well-known techniques, such as the routes described, for example, in the document Walter W Wright and Michael Hallden-Abberton "*Polyimides*" in *Ullmann's Encyclopedia of Industrial Chemistry*, 2002, Wiley-VCH, Weinheim. doi:10.1002/14356007.a21_253.

For example, as commercially available polydienophiles that are useful for the purposes of the invention, mention may be made of bismaleimides and biscitraconimides.

In a preferred arrangement, the rubber composition according to the invention is free of crosslinking system other than one of those described previously, based on one or more peroxide compounds, based on one or more diacid compounds, or based on one or more polydienophile compounds. In particular, when the crosslinking system is based on one or more peroxide compounds or based on one or more diacid compounds, it is advantageously free of vulcanization system, or contains less than 1 phr, preferably less than 0.5 phr and more preferentially less than 0.2 phr thereof. Similarly, the composition is preferentially free of any vulcanization accelerator or activator as known to those skilled in the art or contains less than 1 phr, preferably less than 0.5 phr and more preferentially less than 0.2 phr thereof.

When the crosslinking system advantageously included in the composition according to the invention is based on one or more compounds of thiuram polysulfide type, it advantageously does not require the presence of another crosslinking agent, or of sulfur or of another additional vulcanizing agent (sulfur donor, or vulcanization accelerator or activator). The composition of the invention may thus advantageously be free of sulfur or of such additional vulcanizing agents, or may include only a very small amount thereof, less than 1 phr, preferably less than 0.5 phr and more preferentially less than than 0.2 phr. According to another advantageous embodiment, the composition of the invention may also be free of zinc or of zinc oxide (known as vulcanization activators) or may include only a very small amount thereof, less than 1 phr thereof, preferably less than 0.5 phr, more preferentially less than 0.2 phr.

Reinforcing Filler

Use may be made of any type of reinforcing filler known for its abilities to reinforce a rubber composition that may be used in the manufacture of tyres, for example an organic filler such as carbon black, a reinforcing inorganic filler such as silica, or else a blend of these two types of filler, notably a blend of carbon black and of silica.

All carbon blacks, notably blacks of the HAF, ISAF or SAF type, conventionally used in tyres ("tyre-grade" blacks) are suitable as carbon blacks. Among the latter, mention will be made more particularly of the reinforcing carbon blacks of the 100, 200 or 300 series (ASTM grades), for instance the N115, N134, N234, N326, N330, N339, N347 or N375 blacks, or else, depending on the applications targeted, blacks of higher series (for example N660, N683 or N772).

The carbon blacks might, for example, be already incorporated in an isoprene elastomer in the form of a masterbatch (see, for example, patent applications WO 97/36724 and WO 99/16600).

As examples of organic fillers other than carbon blacks, mention may be made of functionalized polyvinyl organic fillers, as described in patent applications WO-A-2006/069792, WO-A-2006/069793, WO-A-2008/003434 and WO-A-2008/003435.

In the present patent application, the term "reinforcing inorganic filler" should be understood, by definition, as meaning any inorganic or mineral filler (regardless of its colour and its origin, natural or synthetic), also known as "white filler", "clear filler" or even "non-black filler", as opposed to carbon black, which is capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known manner, by the presence of hydroxyl (—OH) groups at its surface.

The physical state in which the reinforcing inorganic filler is provided is not important, whether it be in the form of a powder, of micropearls, of granules, of beads or any other appropriate densified form. Needless to say, the term "reinforcing inorganic filler" also means mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are notably suitable for use as reinforcing inorganic fillers. The silica used may be any reinforcing silica known to those skilled in the art, notably any precipitated or fumed silica with a BET specific surface area and also a CTAB specific surface area both of less than 450 $m^2/g$, preferably from 30 to 400 $m^2/g$. As highly dispersible precipitated silicas ("HDSs"), mention will be made, for example, of the Ultrasil 7000 and Ultrasil 7005 silicas from the company Degussa, the Zeosil 1165MP, 1135MP and 1115MP silicas from the company Rhodia, the Hi-Sil EZ150G silica from the company PPG, the Zeopol 8715, 8745 and 8755 silicas from the company Huber or the silicas with a high specific surface area as described in patent application WO 03/16837.

The reinforcing inorganic filler used, in particular if it is silica, preferably has a BET specific surface area of between 45 and 400 $m^2/g$, more preferentially of between 60 and 300 $m^2/g$.

Preferentially, the content of total reinforcing filler (carbon black and/or reinforcing inorganic filler, such as silica) is between 20 and 200 phr, more preferentially between 30 and 150 phr, the optimum being, as is known, different depending on the specific applications targeted: the level of reinforcement expected for a bicycle tyre, for example, is of course less than that required for a tyre capable of running at high speed in a sustained manner, for example a motorcycle tyre, a tyre for a passenger vehicle or a tyre for a utility vehicle, such as a heavy-duty vehicle.

According to a preferential embodiment of the invention, use is made of a reinforcing filler including between 30 and 150 phr, more preferentially between 50 and 120 phr, of organic filler, particularly of carbon black, and optionally silica; the silica, when it is present, is preferably used at a content of less than 20 phr, more preferentially of less than 10 phr (for example between 0.1 and 10 phr).

Alternatively, according to another preferential embodiment of the invention, use is made of a reinforcing filler including between 30 and 150 phr, more preferentially between 50 and 120 phr, of inorganic filler, particularly of silica, and optionally carbon black; the carbon black, when it is present, is preferably used at a content of less than 20 phr, more preferentially of less than 10 phr (for example between 0.1 and 10 phr).

In order to couple the reinforcing inorganic filler to the elastomer, use is made, in a known manner, of an at least difunctional coupling agent (or bonding agent) intended to provide a satisfactory connection, of chemical and/or physical nature, between the inorganic filler (surface of its particles) and the elastomer, in particular difunctional organosilanes or polyorganosiloxanes.

Use may notably be made of silane polysulfides, referred to as "symmetrical" or "asymmetrical" depending on their particular structure, as described, for example, in patent applications WO 03/002648 (or US 2005/016651) and WO 03/002649 (or US 2005/016650).

As examples of silane polysulfides, mention will be made more particularly of bis(($C_1$-$C_4$)alkoxyl($C_1$-$C_4$)alkylsilyl ($C_1$-$C_4$)alkyl) polysulfides (in particular disulfides, trisulfides or tetrasulfides), for instance bis(3-trimethoxysilylpropyl) or bis(3-triethoxysilylpropyl) polysulfides. Among these compounds, use is made in particular of bis(3-triethoxysilylpropyl) tetrasulfide, abbreviated to TESPT, of formula $[(C_2H_5O)_3Si(CH_2)_3S_2]_2$, or bis(triethoxysilylpropyl) disulfide, abbreviated to TESPD, of formula $[(C_2H_5O)_3Si(CH_2)_3S]_2$. As preferential examples, mention will also be made of bis(mono(C1-C4)alkoxyldi(C1-C4)alkylsilylpropyl) polysulfides (notably disulfides, trisulfides or tetrasulfides), more particularly bis(monoethoxydimethylsilylpropyl) tetrasulfide, as described in patent application US 2004/132880.

As coupling agent other than alkoxysilane polysulfide, mention will be made notably of bifunctional POSs (polyorganosiloxanes) or else of hydroxysilane polysulfides, as described in patent applications WO 02/30939 and WO 02/31041, or else of silanes or POSs bearing azodicarbonyl functional groups, as described, for example, in patent applications WO 2006/125532, WO 2006/125533 and WO 2006/125534.

In the rubber compositions in accordance with the invention, the content of coupling agent is preferably between 4 and 12 phr, more preferably between 4 and 8 phr. In another arrangement, the rubber compositions in accordance with the invention do not comprise any coupling agent.

A person skilled in the art will understand that use might be made, as filler equivalent to the reinforcing inorganic filler described in the present section, of a reinforcing filler of another nature, notably organic nature, provided that this reinforcing filler is covered with an inorganic layer, such as silica, or else includes, on its surface, functional sites, notably hydroxyl sites, making it possible to establish the bonding between the filler and the elastomer in the presence or absence of a covering or coupling agent.

Phenolic Compound

The composition according to the invention comprises at least one phenolic compound of formula (I)

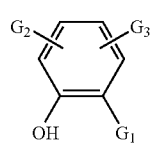

(I)

in which:
$G_1$ represents a hydroxyl, carboxyl or alkoxy group or a hydrogen atom;
$G_2$ represents a hydroxyl group or a hydrogen atom;
$G_3$ represents a hydroxyl, carboxyl, hydrogenocarbonyl, carboxyalkyl, amino or aminoalkyl group or a hydrogen atom;
at least one of the substituents $G_1$ to $G_3$ comprising an oxygen atom, the molar mass of said phenolic compound being at most equal to 1000 g/mol, said composition being free of molecular sulfur or comprising less than 1 phr thereof.

In the present description, the term "phenolic compound" denotes the aromatic compound of general formula (I).

The term "carboxyl group" or "carboxylic acid function" means a group of formula —COOH in which the carbon atom is linked via a double bond to an oxygen atom and via a single bond to a hydroxyl group —OH.

The term "hydrogenocarbonyl group" means a group of formula —CHO in which the carbon atom is linked via a double bond to an oxygen atom and via a single bond to a hydrogen atom.

The term "amino group" means a group of formula —$NH_2$.

The term "aminoalkyl radical" means a radical of formula —$C_nH_{2n}$—$NH_2$, in which n is an integer advantageously between 1 and 15, preferentially between 1 and 10, very preferentially between 1 and 5 and preferably between 1 and 3.

Advantageously, the phenolic compound of general formula (I) is substituted with at least two hydroxyl groups. Preferably, $G_1$, $G_2$ and $G_3$ independently represent a hydroxyl group or a hydrogen atom.

Advantageously, the phenolic compound of general formula (I) is substituted with at least one carboxyl group.

Advantageously, the phenolic compound of general formula (I) is substituted at least in the position para to a hydroxyl group. The term "substituted in the para position" means, as is known to those skilled in the art, that the aromatic nucleus of said phenolic compound is substituted in position 4, said hydroxyl group being considered as being in position 1, positions 1 to 6 corresponding to the carbon atoms constituting said aromatic nucleus.

Surprisingly, the Applicant has discovered that the adhesion properties of the composition according to the invention were particularly improved when the phenolic compound of general formula (I) was substituted at least in the position para to a hydroxyl group, in particular when said phenolic compound is substituted in the position para to a hydroxyl group with a carboxyl group.

Advantageously, $G_1$ and $G_3$ are independently chosen from hydroxyl and carboxyl groups and a hydrogen atom.

Irrespective of the preferred embodiment, the molar mass of the phenolic compound of general formula (I) is at most equal to 1000 g/mol, preferably less than 800 g/mol, preferentially less than 600 g/mol, very preferably less than 400 g/mol, very preferentially less than 220 g/mol, very preferentially less than 200 g/mol, or even 180 g/mol.

The rubber composition according to the invention has particularly advantageous characteristics of adhesion to a metallic component, notably by means of the presence of the phenolic compound of general formula (I), in particular for making composites, and most particularly composites intended for tyres, while at the same time improving the stiffness properties of said composition.

The rubber composition according to the invention advantageously comprises from 0.1 to 25 phr of phenolic compound, preferentially from 2 to 15 phr. Below 0.1 phr, the phenolic compound has no notable effect on the adhesion properties of the rubber composition according to the invention. Above 25 phr, no further significant gain is observed.

Surprisingly, very good adhesion of the composition according to the invention to reinforcing cables is obtained without it being necessary to use cobalt salts. Thus, the composition according to the invention is preferentially free of cobalt salts, as are known to those skilled in the art, and the known effect of which is an improvement in the adhesion, or contains less than 1 phr, preferably less than 0.5 phr, more preferentially less than 0.2 phr and very preferentially less than 0.1 phr thereof.

Various Additives

The rubber compositions in accordance with the invention may also include all or some of the usual additives known to a person skilled in the art and usually used in rubber compositions for tyres, in particular internal layers as defined hereinafter in the present patent application, for instance plasticizers (plasticizing oils and/or plasticizing resins), reinforcing fillers or non-reinforcing fillers other than those mentioned above, pigments, protective agents such as antiozone waxes, chemical antiozonants, antioxidants, antifatigue agents or reinforcing resins (as described, for example, in patent application WO 02/10269).

These compositions may also contain, in addition to the coupling agents, coupling activators, agents for covering the inorganic fillers or more generally processing aids capable, in a known manner, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes (for example octyltriethoxysilane or octeo silane), polyols, polyethers, primary, secondary or tertiary amines, or hydroxylated or hydrolysable polyorganosiloxanes.

Preparation of the Rubber Compositions

The rubber composition in accordance with the invention is manufactured in appropriate mixers using preparation phases that are well known to those skilled in the art:
- a thermomechanical working or kneading phase, which may be performed in a single thermomechanical step during which all the necessary constituents, notably the elastomeric matrix, the phenolic compound, the fillers and the optional various other additives are introduced into an appropriate mixer, such as a standard internal mixer (for example of 'Banbury' type). The incorporation of the filler into the elastomer may be performed in one or more portions while thermomechanically kneading. In the case where the filler, in particular the carbon black, is already incorporated, completely or partly, into the elastomer in the form of a masterbatch, as is described, for example, in patent application WO 97/36724 or WO 99/16600, it is the masterbatch which is directly kneaded and, where appropriate, the other elastomers or reinforcing fillers present in the composition which are not in the masterbatch form, and also the optional various other additives, are incorporated. The thermomechanical kneading is performed at high temperature, up to a maximum temperature of between 110° C. and 200° C., preferably between 130° C. and 185° C., for a period of time generally between 2 and 10 minutes.
- a second phase of mechanical working may then be performed in an external mixer, such as an open mill, after cooling the mixture obtained during the first phase to a lower temperature, typically below than 120° C., for example between 40° C. and 100° C.

The optional crosslinking system will be added, in accordance with the knowledge of a person skilled in the art, during the first or the second phase when the latter is performed. For example, a crosslinking system based on polyacids or on polydienophiles will typically be added during the first phase. A crosslinking system based on peroxides will typically be added during the second phase.

The final composition thus obtained is subsequently calendered, for example in the form of a sheet or of a plaque, notably for laboratory characterization, or else extruded in the form of a rubber semi-finished article (or profiled element).

The composition may be either in the raw state (before crosslinking or vulcanization) or in the cured state (after crosslinking or vulcanization), may be a semi-finished product which can be used in a tyre.

The curing can be performed, in a manner known to those skilled in the art, at a temperature generally between 130° C. and 200° C., under pressure, for a sufficient time which may vary, for example, between 5 and 90 minutes as a function notably of the curing temperature, of the crosslinking system adopted, of the kinetics of crosslinking of the composition under consideration or of the size of the tyre.

Composite

The invention also relates to a composite based at least on a component and on a rubber composition according to the invention.

The expression composite "based at least on a component and on a composition according to the invention" should be understood as meaning a composite comprising the component and said composition, the composition having been able to react with the surface of the component during the various phases of manufacture of the composite, in particular during the crosslinking of the composition or during the manufacture of the composite before crosslinking of the composition.

Said component may be totally or partly metallic or textile-based. In particular, said component may be of textile nature, i.e. made of an organic material, notably a polymeric material, or an inorganic material, for instance glass, quartz, basalt or carbon. The polymeric materials may be of the thermoplastic type, for instance aliphatic polyamides, notably polyamides 6-6, and polyesters, notably polyethylene terephthalate. The polymeric materials may be of the non-thermoplastic type, for instance aromatic polyamides, notably aramid, and cellulose, either natural or artificial, notably rayon.

In one particular arrangement, said component comprises a metal surface.

The metal surface of the component constitutes at least part and advantageously all of the surface of said component and is intended to come into contact with the composition according to the invention.

The composition according to the invention covers at least part of the component, advantageously all of said component.

The component is advantageously partly or entirely metallic, the metal part comprising at least the metal surface. Preferably, the component is entirely made of metal.

According to a first variant of the invention, the metal surface of the component is made of a material which is different from the rest of the component. In other words, the component is made of a material which is at least partly, advantageously totally, covered with a metal layer which forms the metal surface. The material at least partly, advantageously totally, covered with the metal surface is metallic or non-metallic, preferably metallic, in nature.

According to a second variant of the invention, the component is made of the same material, in which case the component is made of a metal which is identical to the metal of the metal surface.

According to one embodiment of the invention, the metal surface comprises a metal chosen from the group consisting of iron, copper, zinc, tin, aluminium, cobalt, nickel and alloys including at least one of these metals. The alloys may be, for example, binary or ternary alloys, such as steel, bronze and brass. Preferably, the metal of the metal surface is iron, copper, tin, zinc or an alloy including at least one of these metals. More preferentially, the metal of the metal surface is steel, brass (Cu—Zn alloy), zinc or bronze (Cu—Sn alloy), even more preferably brass or zinc and very preferably brass.

In the present patent application, the expression "the metal of the metal surface is the metal denoted hereinafter" amounts to saying that the metal surface is made of metal denoted hereinafter. For example, the expression "the metal of the metal surface is brass" written above means that the metal surface is made of brass. Since certain metals are subject to oxidation on contact with ambient air, the metal may be partially oxidized, with the exception of stainless steel.

When the metal surface is made of steel, the steel is preferably a carbon steel or a stainless steel. When the steel is a carbon steel, its carbon content is preferably between 0.01% and 1.2% or between 0.05% and 1.2%, or else between 0.2% and 1.2%, notably between 0.4% and 1.1%. When the steel is stainless, it preferably includes at least 11% of chromium and at least 50% of iron.

The component may be of any shape. Preferably, the component is provided in the form of a thread or of a cable.

According to a particular embodiment of the invention, the component has a length which is at least equal to a millimetre. The length means the longest dimension of the component. As components having a length which is at least equal to a millimetre, mention may be made of the reinforcing elements used, for example, in vehicle tyres, such as threadlike elements (monofilament or cable) and non-threadlike elements.

According to a particularly preferential embodiment of the invention, the composite is a reinforced structure in which the component constitutes a reinforcing element and in which the composition according to the invention coats the reinforcing element.

According to a particularly preferential embodiment, the composite is a reinforced product which comprises reinforcing elements and a calendering rubber in which the reinforcing elements are embedded, each reinforcing element consisting of a component previously defined according to any one of the embodiments of the invention and the calendering rubber comprising the rubber composition according to the invention. According to this embodiment, the reinforcing elements are generally arranged side by side in a main direction. For an application envisaged in the tyre, the composite may thus constitute a tyre reinforcement.

The composite in accordance with the invention may be in the raw state (before crosslinking of the rubber composition) or in the cured state (after crosslinking of the rubber composition). The composite is cured after placing the component in contact with the rubber composition according to the invention.

The composite may be manufactured by a process that comprises the following steps:

making two layers of the composition according to the invention,
taking the component sandwiched in the two layers by depositing it between the two layers,
where appropriate, curing the composite.

Alternatively, the composite may be manufactured by depositing the component on a portion of a layer, the layer is then folded over on itself to cover the component which is thus sandwiched over its entire length or a part of its length.

The layers may be produced by calendering. During the curing of the composite, the rubber composition is crosslinked.

When the composite is intended to be used as a reinforcement in a tyre, the curing of the composite generally takes place during the curing of the tyre casing.

Tyre

The tyre, which is another subject of the invention, has the essential feature of comprising the composition or the composite in accordance with the invention. The tyre may be in the raw state (before crosslinking of the rubber composition) or in the cured state (after crosslinking of the rubber composition). Generally, during the manufacture of the tyre, the composition or the composite is deposited in the raw state (i.e. before crosslinking of the rubber composition) in the structure of the tyre before the step of curing the tyre.

The invention relates in particular to tyres intended to equip motor vehicles of passenger vehicle type, SUVs ("Sport Utility Vehicles"), or two-wheel vehicles (notably motorcycles), or aircraft, or else industrial vehicles chosen from vans, heavy-duty vehicles, i.e. underground trains, buses, heavy road transport vehicles (lorries, tractors, trailers) or off-road vehicles, such as heavy agricultural vehicles or construction vehicles, and the like.

It is possible to define, within the tyre, three types of regions:

The radially exterior region in contact with the ambient air, this region essentially consisting of the tread and of the outer sidewall of the tyre. An outer sidewall is an elastomeric layer positioned outside the carcass reinforcement relative to the inner cavity of the tyre, between the crown and the bead, so as to completely or partially cover the region of the carcass reinforcement extending from the crown to the bead.

The radially interior region in contact with the inflation gas, this region generally consisting of the layer airtight to the inflation gases, sometimes known as interior airtight layer or inner liner.

The internal region of the tyre, i.e. the region between the exterior and interior regions. This region includes layers or plies which are referred to here as inner layers of the tyre. These are, for example, carcass plies, tread sublayers, tyre belt plies or any other layer which is not in contact with the ambient air or the inflation gas of the tyre.

The composition defined in the present description is particularly well suited to the internal layers of tyres.

Thus, the invention also relates to a tyre comprising an internal layer including a composition or a composite according to the present invention. According to the invention, the internal layer may be chosen from the group consisting of carcass plies, crown plies, bead-wire fillings, crown feet, decoupling layers, the tread underlayer and combinations of these internal layers. Preferably, the internal layer is chosen from the group consisting of carcass plies, crown plies, bead-wire fillings, crown feet, decoupling layers and combinations of these internal layers.

Thus, without this being limiting, the subject of the invention is at least one of the following embodiments:
1. A rubber composition based on at least one elastomer, a reinforcing filler and at least one phenolic compound of general formula (I)

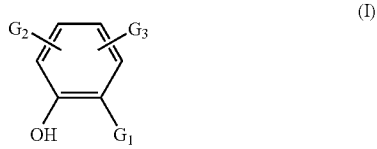

in which:
G$_1$ represents a hydroxyl, carboxyl or alkoxy group or a hydrogen atom;
G$_2$ represents a hydroxyl group or a hydrogen atom;
G$_3$ represents a hydroxyl, carboxyl, hydrogenocarbonyl, carboxyalkyl, amino or aminoalkyl group or a hydrogen atom;
at least one of the substituents G$_1$ to G$_3$ comprising an oxygen atom, the molar mass of said phenolic compound being at most equal to 1000 g/mol, said composition being free of molecular sulfur or comprising less than 1 phr thereof.
2. A rubber composition according to the preceding embodiment, in which said phenolic compound of general formula (I) is substituted with at least two hydroxyl groups.
3. A rubber composition according to either of the preceding embodiments, in which said phenolic compound of general formula (I) is substituted with at least one carboxyl group.
4. A rubber composition according to any one of the preceding embodiments, in which G$_1$ and G$_3$ are independently chosen from hydroxyl and carboxyl groups and a hydrogen atom.
5. A rubber composition according to any one of the preceding embodiments, in which said phenolic compound of general formula (I) is substituted at least in the position para to a hydroxyl group.
6. A rubber composition according to embodiment 1, in which G$_1$, G$_2$ and G$_3$ independently represent a hydroxyl group or a hydrogen atom.
7. A composition according to one of the preceding embodiments, in which the molar mass of said phenolic compound is less than 800 g/mol.
8. A composition according to one of the preceding embodiments, in which the content of phenolic compound is between 0.1 and 25 phr.
9. A composition according to one of the preceding embodiments, in which said composition is free of cobalt salts or contains less than 1 phr thereof.
10. A rubber composition according to any one of the preceding embodiments, in which the reinforcing filler includes carbon black, silica or a mixture of carbon black and silica.
11. A rubber composition according to any one of the preceding embodiments, in which the content of reinforcing filler is between 20 and 200 phr.
12. A rubber composition according to any one of the preceding embodiments, comprising at least one elastomer chosen from diene, olefin and thermoplastic elastomers and mixtures thereof.
13. A rubber composition according to embodiment 12, comprising at least one diene elastomer or one thermoplastic elastomer.
14. A rubber composition according to the preceding embodiment, comprising a crosslinking system based on one or more peroxide compounds, said peroxide compound(s) representing from 0.01 to 10 phr.
15. A rubber composition according to embodiment 13, comprising a crosslinking system based on one or more compounds of thiuram polysulfide type, said thiuram polysulfide compound(s) representing from 0.5 to 15 phr.
16. A rubber composition according to any one of the preceding embodiments, comprising at least one functionalized elastomer.
17. A rubber composition according to embodiment 16, comprising at least one epoxide functionalized elastomer.
18. A rubber composition according to the preceding embodiment, comprising a crosslinking system based on one or more polyacid compounds, said polyacid compound(s) representing from 0.2 to 100 phr.
19. A rubber composition according to embodiment 16, comprising at least one functionalized elastomer comprising a conjugated diene function.
20. A rubber composition according to the preceding embodiment, comprising a crosslinking system based on one or more polydienophiles.
21. A rubber composition according to embodiment 12, comprising at least one thermoplastic elastomer.
22. A rubber composition according to the preceding embodiment, not comprising any crosslinking system.
23. A composite based at least on a component and on a composition according to one of the embodiments 1 to 22.
24. A composite according to the preceding embodiment, having a metal surface.
25. A composite according to the preceding embodiment, in which the metal surface of the component is made of a material which is different from the rest of the component.
26. A composite according to either of the embodiments 24 and 25, in which the metal surface of said component comprises a metal chosen from the group consisting of iron, copper, zinc, tin, aluminium, cobalt, nickel and alloys including at least one of these metals.
27. A composite according to any one of the embodiments 24 to 26, in which the metal of the metal surface is iron, copper, tin, zinc or an alloy including at least one of these metals.
28. A composite according to any one of the embodiments 24 to 27, in which the metal of the metal surface is chosen from the group consisting of brass, steel, zinc and bronze.
29. A composite according to any one of the embodiments 23 to 28, in which the component has a length at least equal to a millimetre.
30. A composite according to any one of the embodiments 23 to 29, in which the component is a thread or a cable.
31. A tyre comprising a composition according to one of the embodiments 1 to 22 or a composite according to one of the embodiments 23 to 30.
32. A tyre comprising an internal layer including a composition according to one of the embodiments 1 to 22 or a composite according to one of the embodiments 23 to 30.

EXAMPLES

The preparation of the various rubber compositions is performed in the following manner: the polymer comprising epoxide functions and then all the other constituents of the mixture are successively introduced into an internal mixer (final degree of filling: approximately 70% by volume), the initial vessel temperature of which is approximately 60° C. Thermomechanical working is then performed in one step until a maximum "dropping" temperature of 150° C. is reached. The mixture thus obtained is recovered and cooled on an external mixer (homofinisher) at 30° C., everything being mixed.

The rubber compositions prepared are presented in Tables 1 and 2.

TABLE 1

|  | C1 | C2 | I1 | I2 | I3 |
|---|---|---|---|---|---|
| NR (1) | 100 | 100 | 100 | 100 | 100 |
| Carbon black (2) | 50 | 60 | 60 | 60 | 60 |
| Dicumyl peroxide (3) | 2.5 | 2.5 | 2.5 | 2.5 | 2.5 |
| Catechol grafted diene polymer (4) | 0 | 15 | 0 | 0 | 0 |
| Gallic acid (3) | 0 | 0 | 5 | 0 | 0 |
| Protocatechuic acid (3) | 0 | 0 | 0 | 5 | 0 |
| para-Hydroxybenzoic acid (3) | 0 | 0 | 0 | 0 | 5 |

All the compositions are given in phr

TABLE 2

|  | I4 | I5 | I6 | I7 | I8 | I9 |
|---|---|---|---|---|---|---|
| NR (1) | 100 | 100 | 100 | 100 | 100 | 100 |
| Carbon black (2) | 50 | 60 | 60 | 60 | 60 | 60 |
| Dicumyl peroxide (3) | 2.5 | 2.5 | 2.5 | 2.5 | 2.5 | 2.5 |
| Salicylic acid (3) | 5 | 0 | 0 | 0 | 0 | 0 |
| Dopamine (3) | 0 | 5 | 0 | 0 | 0 | 0 |
| Phloroglucinol (3) | 0 | 0 | 5 | 0 | 0 | 0 |
| Resorcinol (3) | 0 | 0 | 0 | 5 | 0 | 0 |
| Guaiacol (3) | 0 | 0 | 0 | 0 | 5 | 0 |
| 1,2,4-Benzenetriol (3) | 0 | 0 | 0 | 0 | 0 | 5 |

All the compositions are given in phr (1) Natural rubber
(2) N326
(3) Supplied by Sigma-Aldrich
(4) poly(isoprene-co-dihydroxycinnamic methacrylate), $Mn=6500$ g/mol, $Mw=15300$ g/mol, 3,4-dihydroxyaryl group 0.92 meq/g supplied by the company Specific Polymers It is noted that the composition "C" does not include any specific phenolic compound. The catechol grafted diene polymer corresponds to the teaching of WO2017/081387. It is introduced at 15 phr so as to have, in moles, similar amounts of active polyphenol groups introduced into the composition relative to the other test compounds.

Example 1

The stiffness of the rubber composition is determined by means of tensile tests. These tests make it possible to determine the elasticity stresses and the properties at break. Unless otherwise indicated, they are performed in accordance with the French standard NE T46-002 of September 1988. At second elongation (i.e. after an accommodation cycle at the extension rate provided for the measurement itself) the nominal secant modulus values (or apparent stresses, in MPa) are measured at 10% elongation (denoted by MA10). All these tensile measurements are performed under the standard conditions of temperature (23±2° C.) and hygrometry (50±5% relative humidity), according to the French standard NF T 40-101 (December 1979).

The results are expressed in base 100 relative to the rubber composition "C1" presented in Table 1.

TABLE 3

| Composition | | | | | | | | | | |
|---|---|---|---|---|---|---|---|---|---|---|
|  | C1 | C2 | I1 | I2 | I3 | I4 | I5 | I6 | I7 | I8 | I9 |
| MA10 | 100 | 106 | 151 | 121 | 139 | 117 | 121 | 124 | 108 | 107 | 106 |

Example 2

The quality of the bonding between the rubber composition and the component is determined by a test in which the force required to extract sections of individual threads having a metal surface from the crosslinked rubber composition is measured. For this purpose, composites are prepared in the form of test specimens containing, on the one hand, individual metallic threads as component having a metal surface and, on the other hand, an elastomer mixture comprising the crosslinked rubber composition.

Preparation of the Test Specimens

The rubber compositions are used to prepare a composite in the form of a test specimen, according to the following protocol:

A block of rubber is prepared, consisting of two plates applied to each other before curing. The two plates of the block consist of the same rubber composition. It is during the preparation of the block that the individual threads are trapped between the two plates in the raw state, at an equal distance apart and while leaving to protrude, on either side of these plates, an individual thread end having a length sufficient for the subsequent tensile test. The block including the individual threads is then placed in a mould adapted to the targeted test conditions and left to the discretion of a person skilled in the art; by way of example, in the present case, the block is cured at 170° C. for a time varying from 25 min to 90 min according to the composition under a pressure of 5.5 tonnes.

The individual threads are brass-coated steel threads. Their diameter is 1.75 mm; the thickness of the brass coating is from 200 nm to 1 μm.

The test specimens thus prepared with compositions in accordance with the invention correspond to composites in accordance with the invention.

Adhesion Test

On conclusion of the curing, the resulting test specimen consisting of the crosslinked block and individual threads is placed between the jaws of a suitable tensile testing machine in order to make it possible to test each section individually, at a given rate and a given temperature (for example, in the present case, at 100 mm/min and ambient temperature).

The adhesion levels are characterized by measuring the "tearing-out" force for tearing the sections out of the test specimen.

The results are expressed in base 100 relative to a control test specimen which contains individual threads of identical nature to that of the test specimen tested and which contains the rubber composition "C1" presented in Table 1.

A value greater than that for the control test specimen, arbitrarily set at 100, indicates an improved result, i.e. a greater tearing-out force than that for the control test specimen, the value of which is arbitrarily set at 100.

TABLE 4

| | Composition | | | | | | | | | | |
|---|---|---|---|---|---|---|---|---|---|---|---|
| | C1 | C2 | I1 | I2 | I3 | I4 | I5 | I6 | I7 | I8 | I9 |
| Brass | 100 | 1733 | 2467 | 3400 | 2317 | 167 | 317 | 583 | 200 | 133 | 1283 |

Table 4 shows the results of the adhesion tests performed on control test specimens and on test specimens in accordance with the invention.

The composites in accordance with the invention, which have values very much higher than 100 in the adhesion test, have a greatly improved resistance to tearing-out.

It is also remarkable to note that the improvement in the performance of the composite is observed in the absence of any sulfurization step, which is generally necessary in the manufacturing of composites.

The invention claimed is:

1. A composite comprising a component and a rubber composition, the rubber composition comprising at least one elastomer, a reinforcing filler and at least one phenolic compound of general formula (I)

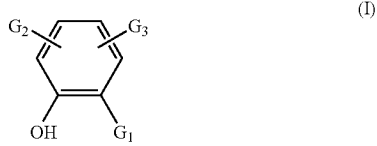

(I)

in which:
 $G_1$ is a hydroxyl, carboxyl or alkoxy group or a hydrogen atom;
 $G_2$ is a hydroxyl group or a hydrogen atom;
 $G_3$ is a hydroxyl, carboxyl, hydrogenocarbonyl, carboxyalkyl, amino or aminoalkyl group or a hydrogen atom,
 wherein at least one of the substituents $G_1$ to $G_3$ comprises an oxygen atom,
 wherein the molar mass of the at least one phenolic compound is at most equal to 1000 g/mol,
 wherein the rubber composition is free of molecular sulfur or comprises less than 1 phr thereof,
 wherein the component is embedded in the rubber composition, and
 wherein the at least one phenolic compound of general formula (I) is substituted at least in the position para to a hydroxyl group.

2. The composite according to claim 1, wherein the at least one phenolic compound of general formula (I) is substituted with at least two hydroxyl groups.

3. The composite according to claim 1, wherein the at least one phenolic compound of general formula (I) is substituted with at least one carboxyl group.

4. The composite according to claim 1, wherein $G_1$ and $G_3$ are independently selected from the group consisting of a hydroxyl group, a carboxyl group, and a hydrogen atom.

5. The composite according to claim 1, wherein $G_1$, $G_2$ and $G_3$ independently are a hydroxyl group or a hydrogen atom.

6. The composite according to claim 1, wherein a molar mass of the at least one phenolic compound is less than 800 g/mol.

7. The composite according to claim 1, wherein a content of the at least one phenolic compound is between 0.1 and 25 phr.

8. The composite according to claim 1, wherein a content of reinforcing filler is between 20 and 200 phr.

9. The composite according to claim 1, wherein the at least one elastomer is selected from the group consisting of diene elastomers, olefin elastomers, thermoplastic elastomers, and mixtures thereof.

10. The composite according to claim 1, wherein the rubber composition further comprises at least one functionalized elastomer.

11. The composite according to claim 1, wherein the at least one functionalized elastomer comprises a conjugated diene function.

12. The composite according to claim 9, wherein the at least one elastomer is at least one thermoplastic elastomer.

13. A tire comprising a composite according to claim 1.

* * * * *